United States Patent [19]
Gibson

[11] Patent Number: 6,149,969
[45] Date of Patent: Nov. 21, 2000

[54] ON-SITE PIPE COATING PROCESS

[75] Inventor: Mark W. Gibson, Etobicoke, Canada

[73] Assignee: Kemacoat International Inc, Ontario, Canada

[21] Appl. No.: 09/192,666

[22] Filed: Nov. 14, 1998

[51] Int. Cl.[7] .................................................. B05C 13/00
[52] U.S. Cl. .......................... 427/142; 427/195; 427/202; 427/318; 427/327; 427/388.2
[58] Field of Search ................................. 427/142, 388.2, 427/195, 202, 327, 318

[56] References Cited

U.S. PATENT DOCUMENTS

| | | |
|---|---|---|
| 2,716,075 | 8/1955 | Weise . |
| 2,718,473 | 9/1955 | Powers . |
| 2,866,718 | 12/1958 | Guzzetta . |
| 3,502,492 | 3/1970 | Spiller . |
| 4,312,902 | 1/1982 | Murase et al. ............................ 427/386 |
| 4,786,339 | 11/1988 | Meyer et al. .............................. 148/6.2 |
| 4,990,383 | 2/1991 | Bergstrom et al. ................... 428/35.09 |
| 5,073,414 | 12/1991 | Castro ....................................... 427/423 |
| 5,178,902 | 1/1993 | Wong et al. ............................. 427/470 |

FOREIGN PATENT DOCUMENTS 9003850  4/1990  WIPO .

*Primary Examiner*—Janyce Bell
*Attorney, Agent, or Firm*—Huntley & Associates

[57] ABSTRACT

A pipe treatment process that is a portable, field-applied, coating process. The process produces a two-layer composite protective coating system with a finished, seamless, chemical bond within its interlayers as well as to adjacent coating materials. The process is suitable for metallic substrates, which may or may not be cathodically protected, and maybe used to coat new or repair previously coated metallic substrates.

23 Claims, 3 Drawing Sheets

६,१४९,९६९

ON-SITE PIPE COATING PROCESS

FIELD OF THE INVENTION

The present invention relates a method for repair of a defective section of a protective coating on the exterior of a metal pipeline. The method is carried out in the field and may be carried out on an operating pipeline.

BACKGROUND OF THE INVENTION

It is common practice to coat sections of new pipelines off-site in a pipe manufacturing operation or at a site other than in-line on the pipeline, to protect the pipeline from corrosion or mechanical damage. It is important for the long term protection of the pipeline that all sections of the pipeline have a viable coating.

Pipeline coatings invariably became damaged or defective, as a result of damage during installation, movement of rocks or other abrasive materials in the ground e.g. due to settling of soil or freeze/thaw cycles in certain areas, or aging of the coatings.

A wide variety of portable field-applied coatings are in use to recoat previously coated, and partially protected, aged metallic substrates e.g. in service steel pipeline fittings and assemblies and steel lined pipe. Such aged substrates are normally coated with e.g. mill-applied fusion bonded epoxy powder, extruded bitumen/polyethylene tape wraps, heat-shrink sleeves, two-part liquid epoxies applied by brush, by roller or by airless spray equipment; and modified liquid urethanes which are also applied either by brush, by roller or by airless spray equipment.

While each of these field-applied coatings is useful in certain applications, there are compatibility and performance limitations on both new and aged metallic substrates. Moreover, in situ coating repairs are difficult or impossible to accomplish in a manner that re-coats the pipeline with the coating originally applied to the pipe in a plant site.

Fusion bonded epoxy powders generally exhibit excellent adhesion and excellent cathodic disbandment properties. However, these coatings tend to be brittle and prone to handling damage and to display high moisture permeation. The coatings are useful as a new coating on metallic substrates, but generally are not chemically compatible with other coatings such as extruded plastics and plastic film. This excludes them from use with such dissimilar coated surfaces. For instance, fusion bonded epoxy powders, by themselves, are not compatible or reliable coatings with two or three layer, mill-coated composites as found on new steel line pipe.

Thermoset coatings, which include two-part liquid epoxy and two-part liquid urethanes, generally exhibit excellent adhesion and cathodic disbandment properties. However, these coatings also tend to be brittle and prone to handling damage and to display high moisture permeation. Thermoset coatings work well as either a new or recoat coating when the already-applied coating is also a thermoset material or a fusion bonded epoxy powder. However, they are not chemically compatible with other coatings such as extruded plastics and plastic films, and tend not be usable with such dissimilar coated surfaces. Thermoset coatings, by themselves, generally are not reliable with two or three layer mill-coated composites as found on new steel line pipe.

Tape wraps and heat-shrink sleeves show a much lower adhesion to metal substrates and to other coatings, when compared to thermoset materials. Consequently, they do not withstand attacks from soil stress and soil loads, common situations for buried metal pipe. Tapes and sleeves also leave a visible seam with the underlying substrate, which is susceptible to adhesive failure. Adhesive failure can provide a path through which moisture and other contaminants can migrate to undermine the integrity of the remaining bond and attack the underlying substrate.

An example of a method for repairing a coating in the field using a thermospray process is described in U.S. Pat. No. 5,792,518.

SUMMARY OF THE INVENTION

Aspects of the present invention provide a new portable and field-applied, coating process that produces a two layer composite, protective coating with a finished, seamless bond between its interlayers and to other adjacent coating materials and which may be used to coat new or to recoat previously coated, cathodically protected or not, metallic substrates, without using a thermospray process.

Accordingly, an aspect of the present invention provides a method for repair of a defective section of a protective coating on the exterior of a metal pipeline in the field, comprising:

(a) stripping a portion of said protective coating from said pipeline, said portion including the defective section of the protective coating;

(b) forming a clean metal surface on said portion of the pipeline;

(c) applying an undercoat of at least 5 mil of liquid polyepoxide or polyurethane composition to said clean metal surface, said composition having a curing agent for said polyepoxide or polyurethane;

(d) optionally applying a non-melted, powder layer of a thermoplastic polyolefin selected from ethylene/(meth) acrylic acid copolymers and polyolefins modified with functional ethylenically unsaturated carboxylic acid groups or derivatives by means of forced air onto the entire surface of the undercoat and onto the protective coating adjacent thereto;

(e) allowing the undercoat to cure until the coating exhibits no flow when a stream of heated air is applied; and (f) applying a topcoat of at least 5 mil of a thermoplastic polyolefin selected from ethylene/(meth)acrylic acid copolymers and polyolefins modified with functional ethylenically unsaturated carboxylic acid groups, or derivative thereof, onto said undercoat, by contacting the undercoat and protective coating adjacent thereto with said thermoplastic polyolefin in a non-melted state, the pipeline being at a temperature such that the polyolefin melts and undergoes melt flow on contacting the undercoat and protective coating adjacent thereto.

The present invention further provides a method for application of an exterior protective coating on a minor section of a metal pipeline, comprising:

(a) providing a clean metal surface;

(b) applying an undercoat of at least 5 mil of liquid polyepoxide or polyurethane composition to said clean metal surface, said composition having a curing agent for said polyepoxide or polyurethane;

(c) optionally applying a non-melted, powder layer of a thermoplastic polyolefin selected from ethylene (meth) acrylic acid copolymers and polyolefins modified with functional ethylenically unsaturated carboxylic acid groups or derivatives by means of forced air onto the surface of the undercoat and onto the protective coating adjacent thereto;

(d) allowing the undercoat to cure until the coating exhibits no flow when a stream of heated air is applied; and (e) applying a topcoat of at least 5 mil of a thermoplastic polyolefin selected from ethylene/(meth)acrylic acid copolymers and polyolefins modified with functional ethylenically unsaturated carboxylic acid groups, or derivative thereof, onto said undercoat, by contacting the undercoat and protective coating adjacent thereto with said thermoplastic polyolefin in a non-melted state, the pipeline being at a temperature such that the polyolefin melts and undergoes melt flow on contacting the undercoat and protective coating adjacent thereto.

The preferred embodiment of the methods, the thermoplastic polyolefin is in the form of a powder, film or tape.

BRIEF DESCRIPTION OF THE DRAWINGS

The invention will now be described with reference to the embodiments shown in the drawings, in which.

DETAILED DESCRIPTION OF THE INVENTION

Figure 1:
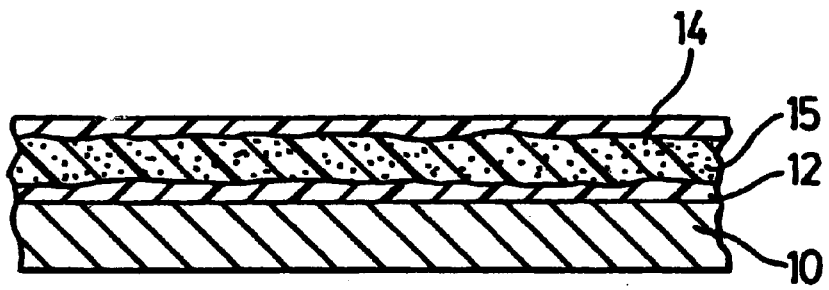
FIG. 1 shows a schematic representation of the layers of a coating applied to a pipeline.

The method of the present invention is a portable, field applied method. It is understood that the method is intended for use in the field i.e. on existing, installed pipelines, which may or may not be operating at the time the method is used. Suitable removal of soil or the like from around the pipeline is required, as will be understood by persons skilled in the art.

The nature of the bond between the thermosetting polymer viz. liquid polyepoxide or polyurethane composition, and functionalized thermoplastic polyolefin in powdered form appears to be an intermingling of undercoat and top coat materials to form a blended material which might be described as a "plastic material composite". In a preferred embodiment discussed below, an additional step is taken to form plastic materials composites. Functionalized thermoplastic polyolefin is described herein and is a ethylene/(meth)acrylic acid copolymer or polyolefin modified with functional ethylenically unsaturated carboxylic acid groups, or derivative thereof The undercoat, which is adherent to the metal surface, may be applied by brushing, spraying or rolling and may form a mechanical and/or chemical bond with the pipe profile.

The metal surface may be a partially exposed surface of a previously coated metal pipe or may be a clean surface of an unused manufactured line pipe. When these pipes or articles have been previously coated with continuous coatings or wrappings and the inventive coating of the invention is to be utilized in a previously coated area, it is necessary to clean the previous coating from a discrete area to be coated accordingly to the invention. For example, if a defect occurs in a coating of a previously coated pipe, it is necessary to clean the previous coating away from the pipe in the region of its defect, and the immediately surrounding area. The inventive coating may then be applied, firstly the layer of liquid thermosetting polymer onto the exposed metal, and secondly, the functionalized thermoplastic polyolefin, optionally with the additional powder layer discussed herein.

If the functionalized thermoplastic polyolefin is applied in the form of a powder, the powder is applied at ambient temperature or with minimal heating. The heat to form the layer of molten polymer on the pipe is provided by the pipe. Thus, the polyolefin does not melt until contact with the undercoat and protective coating adjacent thereto on the pipe. However, the functionalized polyolefin must undergo melt flow on contact with the undercoat and the existing and remaining adjacent protective coating.

Similarly, if the functionalized thermoplastic polyolefin is applied in another form e.g. a film or tape, the film or tape is applied at ambient temperature or with minimal heating. The heat to form the layer of molten polymer on the pipe is provided by the pipe.

The pipe would normally be heated immediately prior to contact of the functionalized thermoplastic polyolefin with the pipe. Any convenient means of heating the pipe may be used, examples of which are infra red and induction heating. It is understood however that the heating could be applied after the functionalized thermoplastic polyolefin is applied, especially if the functionalized thermoplastic polyolefin is in the form of a film or tape.

FIG. 1 shows a metal surface 10 coated according to the invention. The coating comprises an undercoat 12 of thermosetting polymer, obtained from a liquid polyurethane or polyepoxide, and a topcoat (overcoat) 14 of functionalized thermoplastic polyolefin, e.g. a modified polyethylene or polypropylene or ethylene/acrylic acid copolymer. Intermediate layer 15 of plastics material composite is shown between the topcoat 14 and the undercoat 12. It is believed that intermediate layer 14 may be formed when topcoat 14 is applied to undercoat 12. However, intermediate layer 15 may be formed in a separate step. As discussed herein with reference to application of an additional optional layer, it is further understood that the layers of undercoat 12, topcoat 14 and intermediate layer 15 will, to a significant extent, not be separate and distinct layers but rather show a transition in composition between undercoat 12 and topcoat 14.

It should be understood that the thickness of the undercoat, intermediate layer and topcoat shown in FIG. 1 and elsewhere are not to scale.

Figure 2:
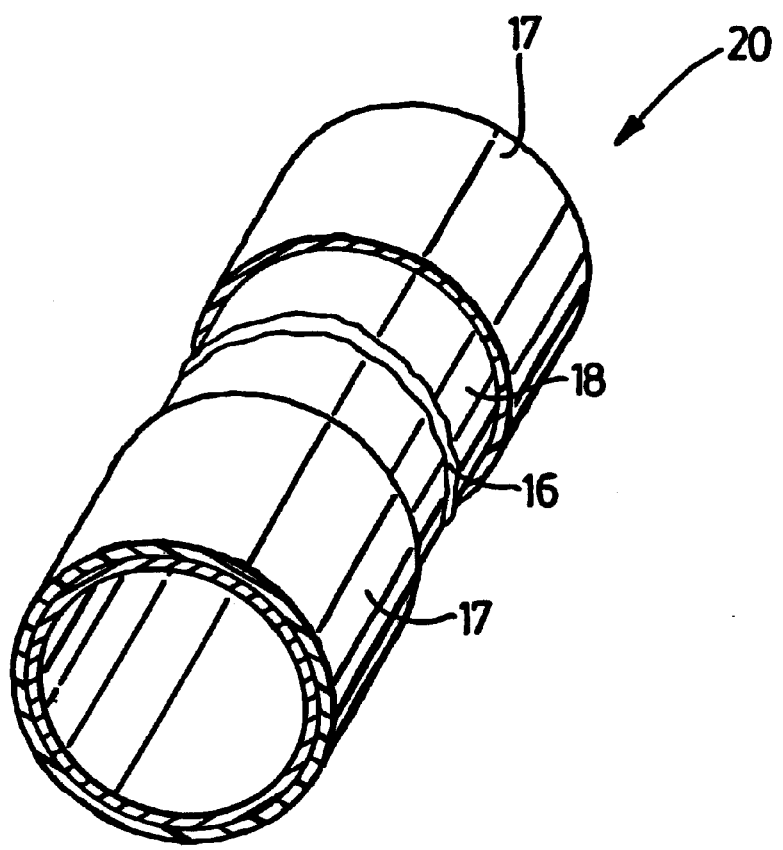
FIG. 2 shows a schematic representation of portion of pipe having a girth weld around its circumference and having a coat by a process of the present invention.

FIG. 2 shows a length of pipe 20 having a girth weld 16 adjoining adjacent pipe lengths. It will be appreciated that while FIG. 2 illustrates a weld 16, the present invention will be equally applicable to any type of join between two pipes or to joins between pipe lengths and a T-junction for a reducer or an elbow or the like. Moreover, the process of the invention might equally be applied to any weakened area of the pipe coating and the description with respect to the embodiment of FIG. 2 would equally apply to any such weakened area.

When pipe 20 that has already been provided with a conventional coating is initially laid or when it is uncovered for rehabilitation or repair, it may be treated by the process of the invention. One embodiment of such a process will now be described.

The welded pipes, 20, are thoroughly cleaned in the region of weld 16 and outbacks 18 located on each side of weld 15. Cleaning may be by sandblasting or by other conventional means. The level of cleaning may be SSPCSP2 (simple wire brushing) up to SP5, SPS or SP10 (SP10 is sandblasting) to remove as much as 4 mils of existing metal surface. It is understood that a section of existing coating may have to be removed, especially where it is believed to be defective, to provide a clean surface where a repair is required. For a new pipeline, less cleaning may be required. It is understood that chromium, zinc or other metal treatments may be applied to the pipe after cleaning but prior to application of liquid undercoats.

After cleaning of cutback 18 and weld 16 between lengths of pipe, which itself is coated with coating 17 except in the area of the cutback and the weld, the cleaned section of pipe is coated with undercoat 12 of liquid thermosetting polymer which will adhere to the metal surface of the pipe and may also blend with the subsequently applied topcoat 14 (partially shown in FIG. 3) of thermoplastic polyolefin. The coating 12 may be applied by brushing, spraying or rolling liquid over the cutback 18 and weld 16. Topcoat 14 may be applied by any of the various methods described herein.

The thermosetting polymer may be a liquid polyepoxide or a polyurethane composition. The thermosetting polymer is applied as a liquid, in a thickness of at least 5 mils, e.g. 5–40 mils, especially 10–20 mils, at ambient temperature. It is not necessary to heat the pipe, although this may be done. If the liquid coating is a polyepoxide, it is preferred that the ambient temperature be at least 10° C. If the liquid coating is a polyurethane, it is preferred that the ambient temperature be at least −20° C. After application of the liquid polyepoxide or polyurethane, the resultant undercoat is permitted to cure to an extent that there is no flow of the coating when a stream of hot air is applied. It is understood that when no flow of the coating is exhibited, application of heat may result in further curing of the undercoat, and even burning of the undercoat.

The time required for sufficient curing of the undercoat depends on the ambient temperature, but typically takes 4–24 hours. This is convenient for operation of the process, as it eliminates the need to apply a topcoat immediately. A pipeline at ambient temperature also facilitates this, although a low amount of heat may be applied to the pipeline.

Examples of polyepoxides include KEMA 500 as manufactured by Kemacoat International Inc., PROTAL 5900 as manufactured by Denso North America, and SPC 2888 as manufactured by Specialty Polymer Coatings.

Examples of polyurethanes include VALPIPE 100 as manufactured by the Valspar Corporation. KEMA 100 as manufactured by Kemacoat International Inc., and PROTEGOL, manufactured in West Germany.

It is understood that both the polyepoxide and polyurethane composition as applied to the pipe will contain a curing agent, as is known for such compositions.

When the undercoat has reached the no-flow condition discussed above, the overcoat is applied.

The overcoat may be applied in the form of a powder at ambient temperature or with minimal heating. For instance, the powder may be blown onto the pipe in a stream of air. However, the pipe must be heated to a temperature such that the powder will melt on contact with the pipe and undergo melt flow thereon. Methods of heating are discussed herein.

Alternatively, the overcoat of functionalized thermoplastic polyolefin is in another form e.g. a film or tape, which would be wound or otherwise applied to the pipe. In some circumstances, it might be preferred to apply the polyolefin in the form of a patch over the overcoat.

The heating of the pipeline may be immediately prior to application of the functionalized thermoplastic polyolefin or subsequent to that application. The preferred method may depend on the form of the functionalized thermoplastic polyolefin.

The polyolefin coating is applied in a thickness of at least 5 mils, e.g. 5–40 mils, especially 10–20 mils, onto the undercoat 12 and the adjacent existing protective coating 17. It is preferred that the pipe be at a temperature such that the polyolefin becomes molten, and moreover melt flows on contact with the undercoat. The temperature required depends on the particular polyolefin, but does not need to be measured as the acceptability of the applied topcoat is determined by noting the melt flow of the polymer. It is understood that excess temperatures that degrade the topcoat should be avoided.

The functionalized polyolefin may be a polyolefin modified (grafted) with the functional ethylenically unsaturated carboxylic acid or derivative thereof, or the polyolefin may be formed from olefin monomers that have been copolymerized with the functional ethylenically unsaturated carboxylic acid. In embodiments, the polyolefin may be a thermoplastic polyolefin modified with at least one ethylenically unsaturated carboxylic acid, or derivative thereof, especially an anhydride or ester thereof. Examples of such functional ethylenically unsaturated carboxylic acids include maleic acid, maleic anhydride and acrylic acid. Examples of polyolefins that may be grafted include polyethylene, polypropylene, or propylene with other monomers e.g. acrylic or methacrylic acid and esters, carbon monoxide and the like, with which a preferred grafting monomer is maleic anhydride. Examples of copolymers include ethylene/acrylic acid copolymers (EAA) and ethylenemethacrylic acid.

Figure 3:
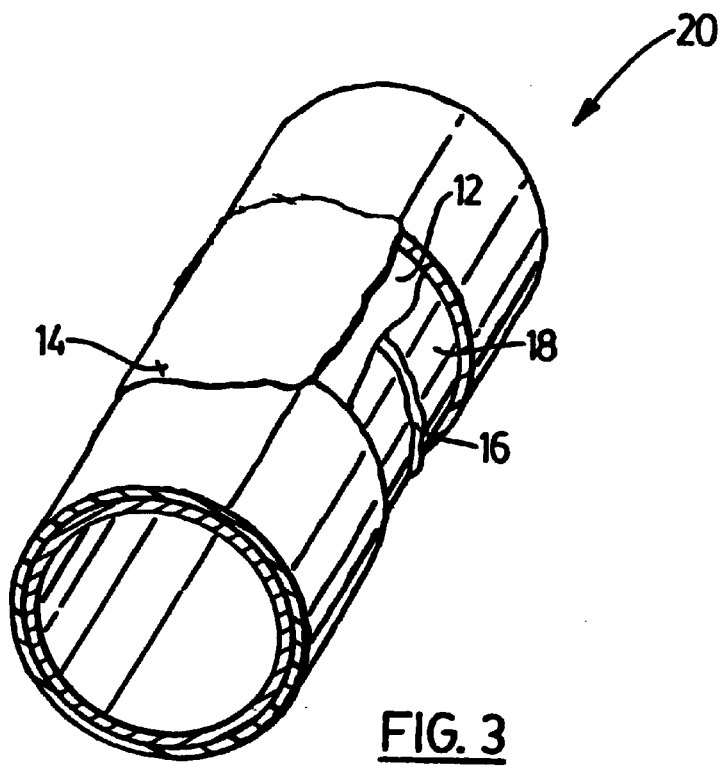
FIG. 3 shows a schematic representation of the pipe of FIG. 2 partially coated during the coating process.
Figure 4:
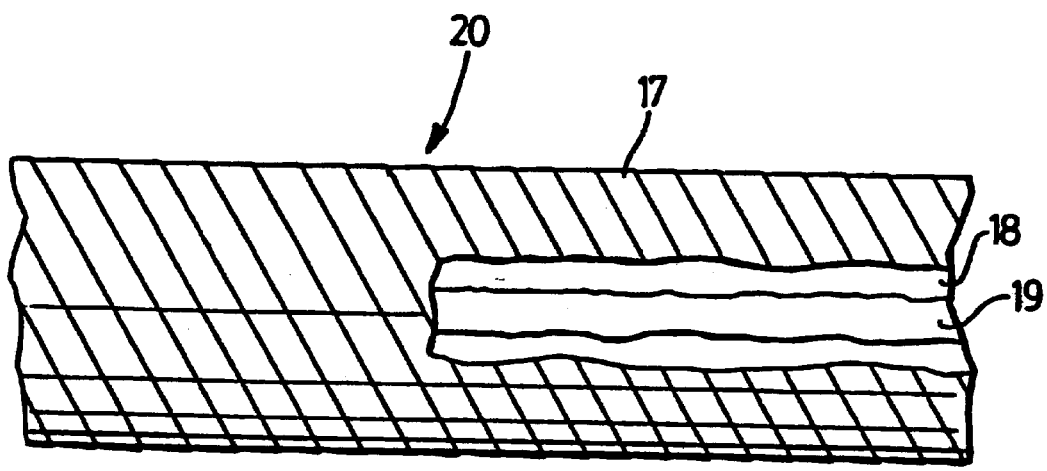
FIG. 4 shows a schematic representation of pipe having a longitudinal weld.
Figure 5:
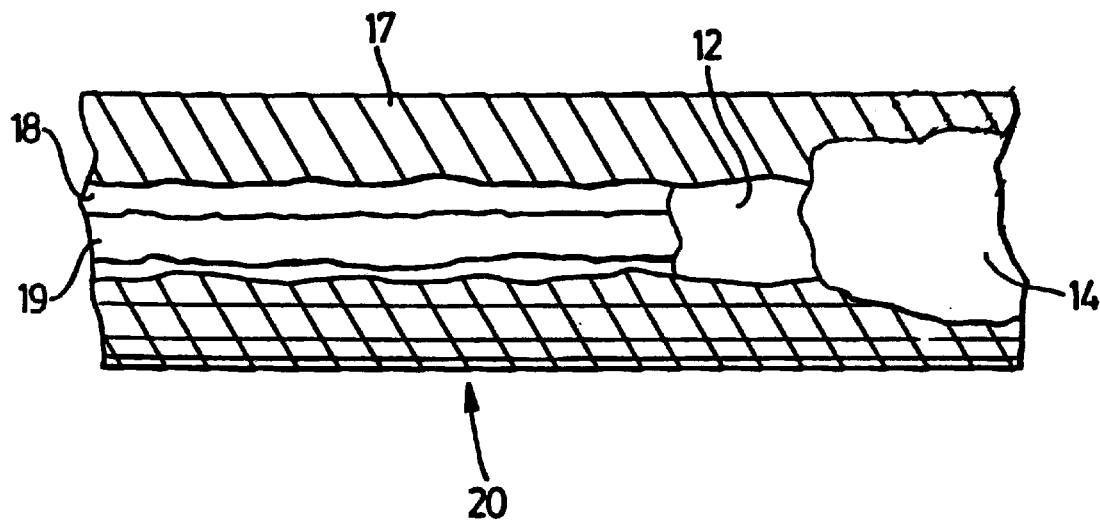
FIG. 5 shows schematic representation of the pipe of FIG. 4 partially coated during the coating process.

FIGS. 4 and 5 shows a longitudinal weld treated in the same manner as that described for the girth weld of FIGS. 2 and 3. Similar reference numerals refer to similar parts. Pipe coating 17, which in this case is a tape wrap, is cleaned away from the longitudinal weld 19 and a two step coating according to the invention is applied.

Although the plastic material composite may be formed in situ by the method discussed above, it may also be formed as an additional, intermediate, step in the process. After the liquid undercoat has been applied, powdered polyolefin may be applied. This is also carried out at ambient temperature, and is akin to a dusting procedure. On application of the powdered polyolefin, the powder becomes occluded in the coating, but excess powder falls from the coating and does not adhere or otherwise combine with the undercoat, hence the analogy to a dusting procedure. While the powdered polyolefin so applied may be different from that of the undercoat, it is conveniently the same powdered polyolefin as subsequently applied.

The method of the present invention may be applied for repair of a pipeline having a wide variety of defects, including separation of the existing coating from the pipeline, physical damage to the existing coating and cathodic disbondment of the existing coating. The method may also be used for applying an original coating to a section of pipeline.

The method of the invention is a portable, field-applied, coating process. It is simple and economic in operation, and utilizes relatively inexpensive and less bulky equipment for application of the coatings. As such, it is well suited for field application, including in remote areas where other equipment could not be readily located. Moreover, the process can frequently be utilized on an operating pipeline i.e. it is frequently unnecessary to cease operations of the pipeline in order to utilize the process of the invention to repair the pipeline.

The method of the present invention provides protection that is believed to be equivalent to that using a thermospray, as disclosed in U.S. Pat. No. 5,792,518, but offers the advantages of not requiring use of a thermospray, of alternate heating methods and of application of different forms of a coating.

What is claimed is:

1. A method for repair of a defective section of a protective coating on the exterior of a metal pipeline in the field, comprising:
   (a) stripping a portion of said protective coating from said pipeline, said portion including the defective section of the protective coating;
   (b) forming a clean metal surface on said portion of the pipeline;
   (c) applying an undercoat of at least 5 mil of liquid polyepoxide or polyurethane composition to said clean metal surface, said composition having a curing agent for said polyepoxide or polyurethane;
   (d) optionally applying a non-melted, powder layer of a thermoplastic polyolefin selected from ethylene/(meth)acrylic acid copolymers and polyolefins modified with functional ethylenically unsaturated carboxylic acid groups or derivatives by means of forced air onto the entire surface of the undercoat and onto the protective coating adjacent thereto;
   (e) allowing the undercoat to cure until the coating exhibits no flow when a stream of heated air is applied; and
   (f) applying a topcoat of at least 5 mil of a thermoplastic polyolefin selected from ethylene/(meth)acrylic acid copolymers and polyolefins modified with functional ethylenically unsaturated carboxylic acid groups, or derivative thereof, onto said undercoat, by contacting the undercoat and protective coating adjacent thereto with said thermoplastic polyolefin in a non-melted state, the pipeline being at a temperature such that the polyolefin melts and undergoes melt flow on contacting the undercoat and protective coating adjacent thereto.

2. The method of claim 1 in which the undercoat is also applied over the protective coating immediately adjacent to said clean metal surface.

3. The method of claim 2 in which the pipeline is heated prior to application of the topcoat of (f).

4. The method of claims 2 in which the pipeline is heated after application of the topcoat of (f).

5. The method of claim 2 in which the layer of (d) is applied.

6. The method of claim 2 in which the layer of (d) is not applied.

7. The method of claim 2 in which the section of the pipeline with the clean metal surface is heated prior to application of the undercoat.

8. The method of claim 2 in which the pipeline is being used for the conveying of fluids at the time said repair is being effected.

9. The method of claim 2 in which the clean metal surface is formed by sand blasting the portion of the metal pipeline from which the protective coating has been stripped.

10. The method of claim 2 in which the defective section is a minor section of the pipeline.

11. The method of claim 2 in which the overcoat of (f) is a powder.

12. The method of claim 2 in which the overcoat of (f) is a film.

13. The method of claim 2 in which the overcoat of (f) is a tape.

14. The method of claim 2 in which the undercoat and topcoat have thicknesses in the range of 5–40 mils.

15. The method of claim 14 in which the undercoat and topcoat have thicknesses in the range of 10–20 mils.

16. The method of claim 2 in which the undercoat is polyepoxide and the coating is applied at a temperature of at least 10° C.

17. The method of claim 2 in which the undercoat is polyurethane and the coating is applied at a temperature of at least −20° C.

18. The method of claim 2 in which the time between application of the undercoat and application of the topcoat is 4–24 hours.

19. The method of claim 2 in which the thermoplastic polyolefin is a modified polyolefin.

20. The method of claim 2 in which the thermoplastic polyolefin is an ethylene/acrylic acid copolymer.

21. A method for application of an exterior protective coating on a minor section of a metal pipeline, comprising:
   (a) providing a clean metal surface;
   (b) applying an undercoat of at least 5 mil of liquid polyepoxide or polyurethane composition to said clean metal surface, said composition having a curing agent for said polyepoxide or polyurethane;
   (c) optionally applying a non-melted, powder layer of a thermoplastic polyolefin selected from ethylene/(meth)acrylic acid copolymers and polyolefins modified with functional ethylenically unsaturated carboxylic acid groups or derivatives by means of forced air onto the surface of the undercoat and onto the protective coating adjacent thereto;
   (d) allowing the undercoat to cure until the coating exhibits no flow when a stream of heated air is applied; and
   (e) applying a topcoat of at least 5 mil of a thermoplastic polyolefin selected from ethylene/(meth)acrylic acid copolymers and polyolefins modified with functional ethylenically unsaturated carboxylic acid groups, or derivative thereof, onto said undercoat, by contacting the undercoat and protective coating adjacent thereto with said thermoplastic polyolefin in a non-melted state, the pipeline being at a temperature such that the polyolefin melts and undergoes melt flow on contacting the undercoat and protective coating adjacent thereto.

22. The method of claim 21 in which the pipeline is heated prior to application of the topcoat of (e).

23. The method of claim 21 in which the pipeline is heated after application of the topcoat of (e).

* * * * *

Disclaimer 6,149,969—Mark W. Gibson, Etobicoke, Canada. ON-SITE PIPE COATING PROCESS. Patent dated November 21, 2000. Disclaimer filed December 6, 2000, by the assignee, Kemacoat International Inc.

The term of this patent shall not extend beyond the expiration date of Pat. No. 5,792,518.

*(Official Gazette, March 6, 2001)*

UNITED STATES PATENT AND TRADEMARK OFFICE
CERTIFICATE OF CORRECTION

PATENT NO. : 6,149,969
DATED : November 21, 2000
INVENTOR(S) : Mark W. Gibson

It is certified that error appears in the above-identified patent and that said Letters Patent is hereby corrected as shown below:

Title page,
Insert Item: -- [30] Foreign Application Priority Data
November 10, 1998 [CA] Canada ......... 2,253,220. --

Signed and Sealed this

Tenth Day of May, 2005

JON W. DUDAS
*Director of the United States Patent and Trademark Office*